Figures 1, 6:
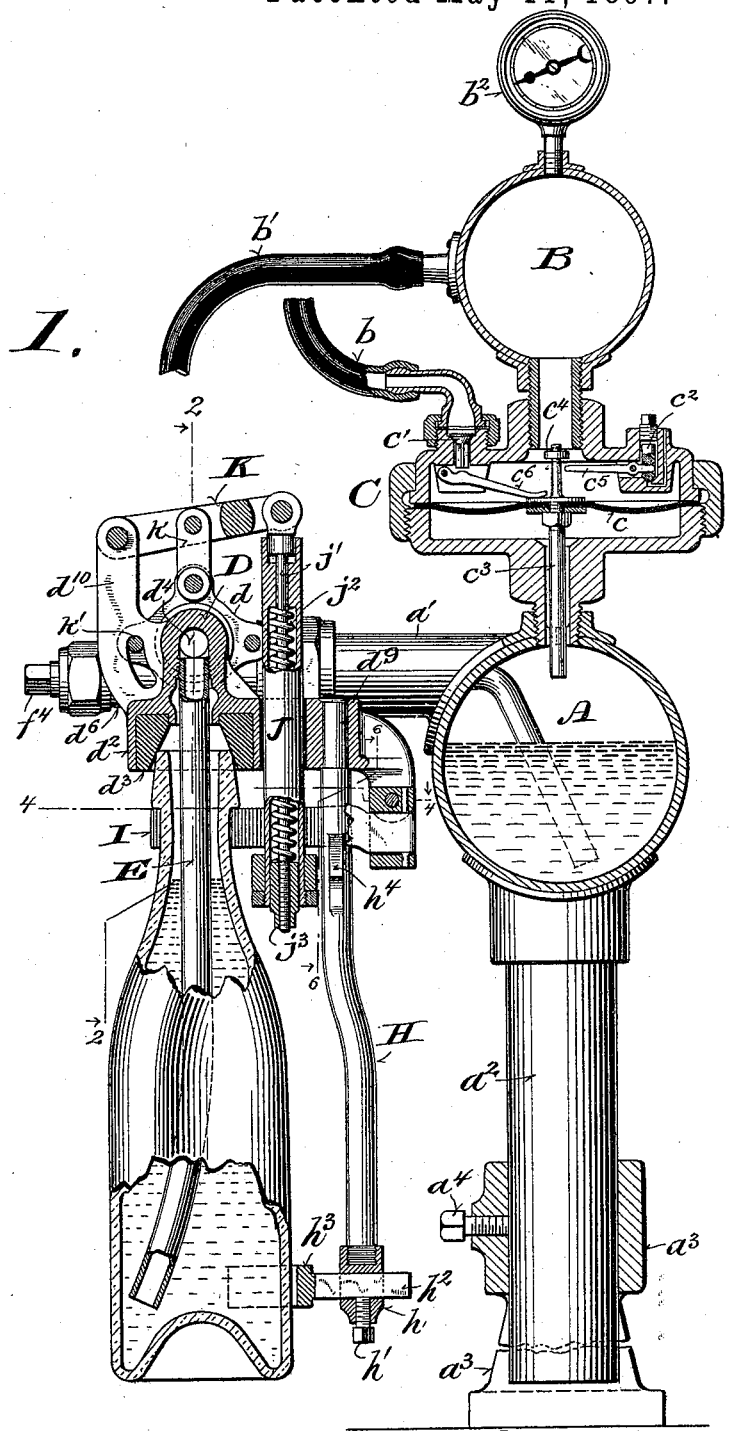

(No Model.) 3 Sheets—Sheet 1.

J. HENES & F. C. KELLER.
APPARATUS FOR BOTTLING LIQUIDS.

No. 582,285. Patented May 11, 1897.

Witnesses:
Geo. W. Young,
Chas. L. Goss.

Inventors
John Henes
Frank C. Keller

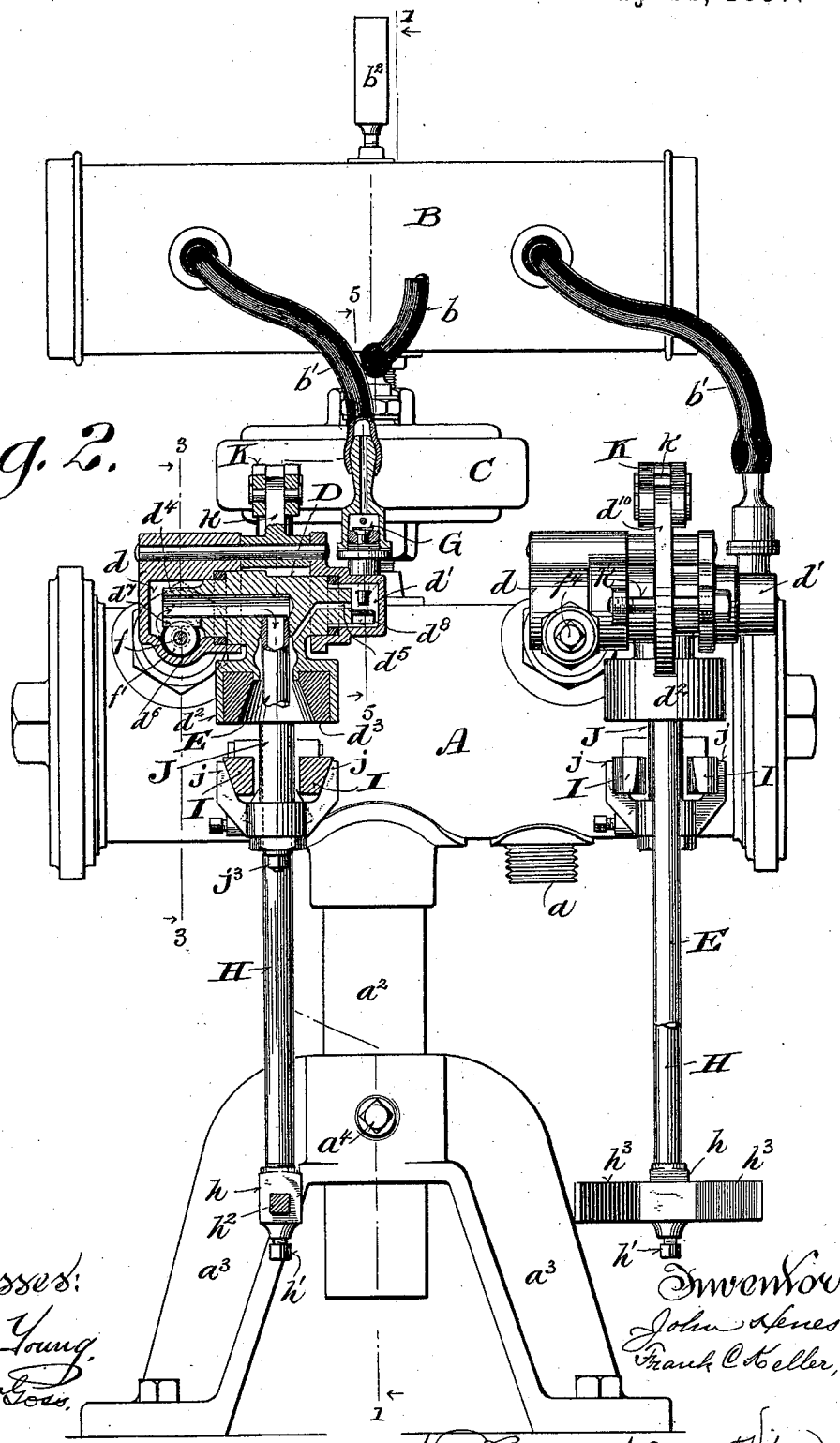

(No Model.) 3 Sheets—Sheet 3.
J. HENES & F. C. KELLER.
APPARATUS FOR BOTTLING LIQUIDS.
No. 582,285. Patented May 11, 1897.
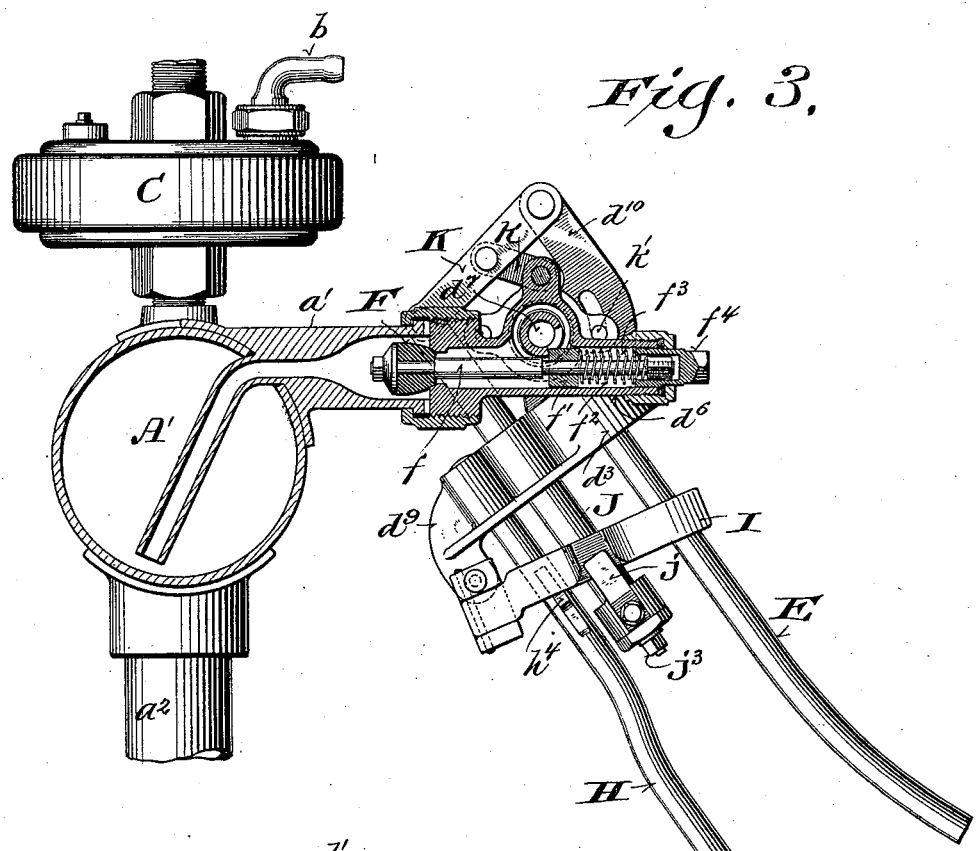

UNITED STATES PATENT OFFICE.

JOHN HENES, OF MENOMINEE, MICHIGAN, AND FRANK C. KELLER, OF MILWAUKEE, WISCONSIN.

APPARATUS FOR BOTTLING LIQUIDS.

SPECIFICATION forming part of Letters Patent No. 582,285, dated May 11, 1897.

Application filed December 19, 1895. Serial No. 572,639. (No model.)

*To all whom it may concern:*

Be it known that we, JOHN HENES, of Menominee, in the county of Menominee and State of Michigan, and FRANK C. KELLER, of Milwaukee, in the county of Milwaukee and State of Wisconsin, have invented certain new and useful Improvements in Apparatus for Bottling Liquids; and we do hereby declare that the following is a full, clear, and exact description of the invention, which will enable others skilled in the art to which it pertains to make and use the same, reference being had to the accompanying drawings, and to the letters of reference marked thereon, which form a part of this specification.

The main objects of our invention are to facilitate the bottling of carbonated or effervescing beverages or liquids and to avoid foaming and loss of such liquids in the operation of bottling.

It consists of certain novel features in the process and apparatus hereinafter particularly described, and pointed out in the claims.

In the accompanying drawings like letters designate the same parts in the several figures.

Figure 1 is a vertical cross-section of apparatus embodying our improvements on the line 1 1, Fig. 2. Fig. 2 is a front elevation and partial vertical longitudinal section on the line 2 2, Fig. 1, of the apparatus. Fig. 3 is a vertical cross-section of a portion of the apparatus on the line 3 3, Fig. 1. Fig. 4 is a horizontal section on the line 4 4, Fig. 1. Fig. 5 is a similar section on the line 5 5, Fig. 2; and Fig. 6 is a section on the line 6 6, Fig. 1.

The difficulty experienced in transferring effervescing or carbonated liquids from one receptacle to another is that when they are relieved of pressure the gas which they contain escapes, causing the liquid to foam, thereby not only injuriously affecting its keeping qualities and detracting from its vivacity, but also greatly hindering the operation of bottling and tending to waste. It is the aim of our process and apparatus to overcome these difficulties.

Referring to Figs. 1, 2, and 3 of the drawings, A designates a closed chamber or reservoir for holding the liquid to be bottled under pressure at the desired level. It may be conveniently made of metal in cylindrical form and of any desired length, according to the number of filling connections desired. It is provided with a supply connection $a$, communicating with the lower part thereof, and it has one or more delivery connections $a'$, leading out of the upper part thereof and projecting downwardly at their inner ends into the lower part of said chamber or reservoir, as seen in Figs. 1 and 3. Said reservoir is provided on the under side, according to its size, with one or more legs $a^2$, which are adjustable vertically in stands $a^3$ and held therein when adjusted by set-screws $a^4$.

B designates a similar closed chamber for holding gas under pressure. It is preferably located above the liquid-reservoir A and has a gas-supply connection $b$. This connection is provided with a pressure-regulating device consisting of a diaphragm-chamber C, containing a flexible diaphragm $c$, and communicating above said diaphragm with the gas-reservoir B, and below the diaphragm with the upper part of the liquid-reservoir A, and of a supply-valve $c'$, controlling communication between the gas-supply connection $b$ and the upper part of the diaphragm-chamber, and a waste-valve $c^2$, controlling a vent opening or passage out of the upper part of said chamber. The diaphragm is attached to a stem $c^3$, guided in the lower neck of the diaphragm-chamber and provided at its upper end with a nut or adjustable collar $c^4$, adapted to engage with a lever $c^5$ and open the relief-valve $c^2$ when the diaphragm descends. A lever $c^6$ is arranged to be engaged by the diaphragm or a projection on its stem when it rises and to open the supply-valve $c'$.

D D are oscillatory filling-heads and bottle-holders. They are formed on each side with trunnions which are adapted to turn in chambered bearings $d$ $d'$, communicating, respectively, with the delivery connections $a'$ of reservoir A and with the gas-reservoir B through connections $b'$ $b'$. Each head is formed or provided on the under side with a cap $d^2$, which is supplied with a ring $d^3$, of soft rubber or other suitable packing material, having a downwardly-flaring opening to receive and close the mouths of the bottles to be filled. Into a central opening in the cap of each head is screwed a filling tube or nozzle E, which communicates at its upper end through a passage $d^4$ with the chamber in bearing $d$. The other chamber in bearing $d'$ communicates through a passage $d^5$ in each head with the central opening therein outside of the nozzle E. The chambers in each pair of bearings $d$ and $d'$ are separated from each other by a filling-head D, the trunnions of which are provided with packing-rings, as shown in Fig. 2, for closing the open ends of said bearings and preventing leakage from said chambers around the trunnions. Each delivery connection $a'$ is provided between the reservoir A and chambered bearings $d$ with a valve F, which opens inwardly toward said reservoir and has a stem $f$ extending outwardly therefrom through a transverse tubular extension $d^6$ of said bearing, as shown in Fig. 3. The valve-stem is provided with a loose collar $f'$, pressed inwardly against a shoulder on the stem by a spring $f^2$, surrounding the stem between said collar and a nut on its outer end. A spiral spring $f^3$, surrounding the spring $f^2$, bears at its inner end against said collar and at its outer end against a recessed adjusting-screw $f^4$, threaded in the outer end of the tubular extension $d^6$. The adjacent trunnion of the filling-head D is formed with a shoulder or projection $d^7$, adapted to engage with said collar and to close the valve F when the filling-head is turned into position for the removal of a bottle therefrom.

G is a valve in the connection $b'$ between the gas-reservoir B and the chambered bearing $d'$ of each filling-head, as shown in Figs. 2 and 5. It is arranged to be opened inwardly toward said reservoir by a shoulder or projection $d^8$ on the adjacent trunnion of said head.

Each filling-head D is formed with a rearward projection $d^9$ from the cap $d^2$, and to this projection is secured a depending arm H, having a transversely-perforated head $h$ at its lower end, in which is adjustably secured by a set-screw $h'$ the squared shank $h^2$ of a forked rest $h^3$, adapted to receive and support a bottle near the base in the proper relation to the nozzle E and the cap $d^2$. With a depending ear of the extension $d^9$ are connected by universal joints or double pivots two jaws I I, as shown in Figs. 3 and 4, adapted to engage the opposite sides of the neck of a bottle below the shoulder thereon, as shown in Figs. 1 and 4. The arm H is formed on opposite sides with downwardly-diverging inclines $h^4$, as shown in Fig. 6, which are adapted to engage with said jaws and to spread them apart when they are turned downwardly on their supporting pivot connections with the filling-head.

J is a tubular rod passing upwardly through a vertical hole in the extension $d^9$ of each filling-head and provided at its lower end on opposite sides with upwardly-diverging inclines $j$, as shown in Fig. 2, adapted to engage with the outer sides of the jaws I I and to draw them together against the neck of a bottle and upwardly against the shoulder thereon when said rod is raised, as hereinafter explained.

$j'$ is a rod inserted in the tubular rod J and surrounded by a spiral spring $j^2$, which bears at its upper end against a shoulder in the tubular rod J and at its lower end against a nut $j^3$ on the lower end of the rod $j'$, as shown in Fig. 1.

K is a lever pivoted at its rear end to the upper end of the rod $j'$ and at its front end to an upwardly-extending arm $d^{10}$ of the oscillatory filling-head and connected at an intermediate point by a link $k$ with the bearings in which said head turns. The rods J $j'$, the spring $j^2$, and the nut $j^3$ constitute an adjustable yielding connection between the inclines $j\,j$ and the lever K to allow for variations in the distance of the shoulders on the necks of bottles from their mouths. A cross-pin $k'$, secured at the ends in the bearings $d\;d'$ and passing through an arc-shaped slot in the arm $d^{10}$, serves as a stop to limit the movement of the oscillatory filling-head D at the proper points in both directions.

The gas-reservoir B is provided with a pressure-gage or manometer $b^2$, and the liquid-reservoir A may also be provided with a similar gage, if desired, although it is not necessary.

Our improved apparatus operates as follows: The reservoir A is supplied through its connection $a$ with the liquid to be bottled under pressure of, say, eight pounds, the air or gas contained in said reservoir being compressed in the upper part thereof and maintaining the liquid at a level approximately with the mouth of a bottle held in the cap of either of the rotary heads D in position for filling. The supply tube or pipe $b$ of the gas-reservoir B is connected with a source of compressed gas under a pressure equal to or greater than that on the liquid in the reservoir A. The bottles to be filled are then placed on the nozzles E, when they are in the positions shown in Fig. 3, with their bodies against the forked supports $h^3$, their necks between and their shoulders above the jaws I I. They are then turned downwardly at the bottom into the position shown in Fig. 1, their initial movement in that direction operating through the lever K and its connections hereinbefore described to force the inclines $j\,j$ upwardly in engagement with the outer sides of the jaws I I and to draw said jaws together against the neck and shoulder of the bottle and to force and hold its mouth upwardly against the packing-ring $d^3$, thus closing and hermetically sealing the bottle. The continued movement of the filling-head operates to open the valve G by the engagement of the shoulder or projection $d^8$ with its stem and to move the shoulder or projection $d^7$ out of engagement with the collar $f'$ on the stem of valve F. Compressed gas now rushes from reservoir B through connection $b'$ and passage $d^5$ into the bottle, creating a counter-pressure therein, preferably slightly below the pressure in reservoir A. When the pressure in the bottle nearly equals that in reservoir A, it opens the valve F, allowing the liquid to flow from said reservoir into the bottle. The spring $f^3$ is made of sufficient tension to overcome the friction of the valve and its connections in opening and to hold it open against the force of the current of liquid flowing past it. The tension of this spring may be adjusted by screw $f^4$, so as to vary the counter-pressure required to open the valve F. It is, however, preferably adjusted so that the counter-pressure will be approximately equal to or a little below the pressure on the liquid in reservoir A. This slight excess of pressure in said reservoir will serve to elevate the liquid into the delivery connections $a'$, which with the nozzles E operate as siphons when the liquid and gas pressure are approximately equal to draw the liquid from reservoir A into the bottles without materially reducing the pressure thereon or allowing it to come into contact with the atmosphere. The escape of gas with which the liquid is charged and the foaming of the liquid are thus avoided. As the liquid flows into the bottle it displaces the gas and forces it back through passage $d^5$ and connection $b'$ into reservoir B. When the bottle is filled, it is turned outwardly at the bottom, carrying the head D and nozzle E and their connections into the positions in which they are shown in Fig. 3. The initial movement of the filling-head in this direction operates first by engagement of the shoulder or projections $d^7$ on one of its trunnions with the collar $f'$ to positively close the valve F and cut off the flow of liquid to the bottle and by the disengagement of the shoulder or projection $d^8$ on the other trunnion from the stem of valve G permits said valve to close and cut off the supply of gas to the bottle. Further movement of the bottle carries the lever K and its connections into the position in which they are shown in Fig. 3, releasing the jaws I, which being turned downward by their own weight and the weight of the bottle and its contents are spread by engagement with the inclines $h^4$, and thereby releasing the neck and shoulder of the bottle and permitting it to be readily withdrawn from nozzle E. Whenever the pressure in reservoir B rises above the desired limit, approximately equal to or a little below the pressure in reservoir A, it forces the diaphragm $c$ downward, moving the nut or collar $c^4$ on the upper end of its stem into engagement with the inner end of lever $c^5$ and opens the vent-valve $c^2$. As the pressure above the diaphragm falls the diaphragm rises and allows the vent-valve $c^2$ to close. When such pressure reaches the lower limit at which it is desired to maintain it, the valve $c'$ is opened by the lever $c^6$, operated by the upward movement of said diaphragm, and the pressure in reservoir B is restored through the supply connection $b$ from any convenient source with which it communicates. As the gas employed to create a counter-pressure in the bottles to be filled is displaced by the inflowing liquid and forced back into the reservoir B it is desirable, especially if carbonic-acid gas is used, to allow for variation in the pressure in said reservoir within certain limits to avoid unnecessary waste of gas through the frequent opening of the vent-valve $c^2$, since in the operation of a machine having a number of filling connections if a number of bottles are filled simultaneously a greater volume of gas will be withdrawn from the reservoir at a given time than when the bottles are filled successively. To provide for such variation in volume and pressure without unnecessary waste of gas, the projections on the diaphragm for operating the supply and waste valves $c'$ and $c^2$ may be arranged so as to allow the diaphragm a considerable range of movement without affecting said valves.

To reduce the pressure in reservoir B relative to that maintained in reservoir A the weight on the diaphragm $c$ may be increased. The spring $f^2$ on the stem of the valve F serves to hold the valve-stem $f$ in the proper relation to the loose collar $f'$ and with the spring $f^3$ permits said collar to yield outwardly and the head D to be turned into position for the removal of a bottle after the valve F is closed.

By the term "bottling" as used herein we contemplate the filling of any kind of receptacles, such as jugs, kegs, or barrels, as well as bottles suitable for holding carbonated or effervescing liquids; and we use the term "gas" in its generic sense, including air, carbonic-acid gas, and any other gas that may be suitable for producing the desired counter-pressure in the bottles or other receptacles to be filled with liquid.

We do not wish to be understood as limiting ourselves to the exact details herein shown and described, as they may be variously modified within the spirit and intended scope of our invention.

We claim—

1. In apparatus for bottling liquids the combination of a closed liquid-reservoir having a supply connection, a filling tube or nozzle having a valve-controlled connection with said reservoir, a gas-reservoir having a supply connection, a pressure-regulating device in said connection controlled by the pressure in said liquid-reservoir, a valve-controlled connection with the gas-reservoir adapted to be put in communication with a bottle or vessel to be filled while liquid is being admitted thereto from said liquid-reservoir, and means for operating the valves in said connections, whereby the liquid may flow into the bottle against a counter-pressure approximately equal to the pressure in the liquid-reservoir, substantially as and for the purposes set forth.

2. In apparatus for bottling liquids, the combination with closed liquid and gas reservoirs having supply and delivery connections, of a movable head with which the delivery connections of said reservoirs communicate, a valve in the delivery connection of the gas-reservoir adapted to be automatically opened and closed by the operation of said movable head, and a valve in the delivery connection of the liquid-reservoir adapted to automatically open when the pressure of gas in the bottle becomes approximately equal to the opposing pressure of the liquid, substantially as and for the purposes set forth.

3. In apparatus for bottling liquids the combination with liquid and gas reservoirs, of a movable filling-head, having valve-controlled connections with said reservoirs and provided with a cap to receive and close the mouth of a bottle and jaws adapted to be engaged by the movement of the bottle into filling position with the shoulder on the neck of the bottle and to hold its mouth in engagement with said cap, substantially as and for the purposes set forth.

4. In apparatus for bottling liquids, the combination of a closed liquid-reservoir having supply and delivery connections opening into the lower part thereof, a gas-reservoir having one or more delivery connections, and a pressure-regulating device consisting of a diaphragm-chamber provided with a flexible diaphragm and communicating on opposite sides thereof with said reservoirs, gas supply and waste connections with that part of the diaphragm-chamber in communication with the gas-reservoir and valves in said connections arranged to be operated by the movement of said diaphragm, substantially as and for the purposes set forth.

5. In apparatus for bottling liquids, the combination of gas and liquid reservoirs having supply and delivery connections, an oscillatory filling-head in communication with the delivery connections of said reservoirs, and a valve in the delivery connection of the liquid-reservoir, adapted to be opened by a counter gas-pressure against the liquid-pressure and to be closed by the turning of the filling-head to remove a bottle therefrom, substantially as and for the purposes set forth.

6. In apparatus for bottling liquids, the combination of gas and liquid reservoirs having supply and delivery connections, an oscillatory head having a filling-nozzle in communication with a delivery connection of the liquid-reservoir and a separate passage in communication with a delivery connection of the gas-reservoir, a valve in the delivery connection of the liquid-reservoir adapted to be released by turning said head in one direction and opened by counter gas-pressure and to be closed by turning the head in the opposite direction, and a valve in the delivery connection of the gas-reservoir adapted to be opened by turning said head into position for filling a bottle, substantially as and for the purposes set forth.

7. In apparatus for bottling liquids, the combination of gas and liquid reservoirs having supply and delivery connections, an oscillatory head having separate passages communicating with the delivery connections of the liquid and gas reservoirs respectively, and a valve in the delivery connection of the liquid-reservoir arranged to open toward said reservoir and having a yielding operating connection with said head whereby the initial movement of said head in one direction closes said valve, and a further movement thereof for the disengagement and removal of the bottle is permitted after said valve is closed, substantially as and for the purposes set forth.

8. In apparatus for bottling liquids, the combination of gas and liquid reservoirs having supply and delivery connections, an oscillatory head provided with a filling-nozzle in communication with the delivery connection of the liquid-reservoir, a cap around said nozzle for closing the mouth of a bottle, and a passage in communication with the delivery connection of the gas-reservoir opening into said cap outside of said nozzle, jaws arranged to embrace the neck of a bottle and to engage with the shoulder thereon, and valves in said delivery connections, said jaws being connected with said head and arranged to be closed upon the neck of a bottle and forced upwardly against the shoulder thereon by the initial movement of said bottle in turning it into position to be filled, the valve in the gas-delivery connection being arranged to be opened by the further movement of a bottle in the same direction and the valve in the liquid-delivery connection being arranged to be closed by the initial movement of said head in the opposite direction, substantially as and for the purposes set forth.

In testimony that we claim the foregoing as our own we affix our signatures in presence of two witnesses.

JOHN HENES.
FRANK C. KELLER.

Witnesses as to John Henes:
  ALB. DUDLY,
  L. M. PACKARD.
Witnesses as to Frank C. Keller:
  E. V. WRIGHT,
  CHAS. L. GOSS.